US006446099B1

United States Patent
Peairs (10) Patent No.: US 6,446,099 B1
(45) Date of Patent: Sep. 3, 2002

(54) DOCUMENT MATCHING USING STRUCTURAL INFORMATION

(75) Inventor: Mark Peairs, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/164,091

(22) Filed: Sep. 30, 1998

(51) Int. Cl.[7] .............................................. G06F 17/21
(52) U.S. Cl. ........................................... 707/517; 707/3
(58) Field of Search .............................. 707/500, 515, 707/517, 3, 5, 6

(56) References Cited

U.S. PATENT DOCUMENTS

| | | |
|---|---|---|
| 5,297,032 A | 3/1994 | Trojan et al. |
| 5,305,200 A | 4/1994 | Hartheimer et al. |
| 5,319,745 A | 6/1994 | Vinsonneau et al. ........ 707/515 |
| 5,465,353 A | 11/1995 | Hull et al. ..................... 707/5 |
| 5,581,752 A | 12/1996 | Inoue et al. ................. 707/526 |
| 5,748,780 A | 5/1998 | Stolfo ......................... 382/232 |
| 5,758,062 A | 5/1998 | McMahon et al. |
| 5,822,454 A | 10/1998 | Rangarajan ................. 382/180 |
| 5,874,717 A | 2/1999 | Kern et al. .................. 235/379 |

(List continued on next page.)

OTHER PUBLICATIONS

Smith, S.M. and Brady, J.M., "SUSAN—a new approach to low level image processing." Int. Journal of Computer Vision, 23(1):45–78, May 1997.

Niblack, W., et al., "The QBIC Project: Querying Images By Content Using Color, Texture and Shape" SPIE Proceedings, vol. 198, pp. 173–187 Feb., 1993.

J.F. Canny, "A Computational Approach to Edge Detection" IEEE Trans. Patt. Anal. Machine Intell. vol. PAMI–8, No. 6, pp. 67–108, 1986.

Magnifi Inc. "Magnifi Enterprise Server 2.0" © 1997–1998. Eric M. Hoffert and Joshua B. Weisberg "New Media Data Mangement" 1997.

Daniel P. Huttenlocher, Gregory A. Klanderman and William J. Rucklidge "Comparing Images Using the Hausdorff Distance" IEEE Transactions on Pattern Analysis and Machine Intelligence, vol. 15, No. 9, Sep. 1993.

Ilingworth, J.& Kittler, J. "A Survey of Hough Transform" Journal of Computer Vision, Graphics & Image Processing, vol. 44, pp. 87–116, 1988.

(List continued on next page.)

*Primary Examiner*—Stephen S. Hong
(74) *Attorney, Agent, or Firm*—Blakely, Sokoloff, Taylor & Zafman LLP (57) ABSTRACT

A method and apparatus for document matching using structural information. The present invention provides a method and apparatus for identifying documents based on the visual structure of the document. Structural information describing a document is generated and used to search for matching stored documents. In one embodiment, images are converted to a point set and the point sets are compared. For example, an image of a document that is sought is converted to a point set and the point set is compared to point sets corresponding to stored documents. When point sets match within a predetermined tolerance, the documents match. In one embodiment, the Hausdorff measure is used to compare point sets.

17 Claims, 5 Drawing Sheets

U.S. PATENT DOCUMENTS

| | | |
|---|---|---|
| 5,881,230 A | 3/1999 | Christensen et al. |
| 5,896,252 A | 4/1999 | Kanai |
| 5,920,870 A | 7/1999 | Briscoe et al. |
| 5,923,504 A | 7/1999 | Arajki et al. |
| 5,933,823 A | 8/1999 | Cullen et al. |
| 5,949,622 A | 9/1999 | Kamiguchi et al. |
| 5,986,858 A | 11/1999 | Sata et al. |
| 5,999,664 A | 12/1999 | Mahoney et al. ........... 382/305 |
| 6,023,684 A | 2/2000 | Pearson |
| 6,032,184 A | 2/2000 | Cogger et al. |
| 6,049,664 A | 4/2000 | Dale et al. |
| 6,104,834 A | 8/2000 | Hull ........................... 382/209 |
| 6,128,602 A | 10/2000 | Northington et al. |

OTHER PUBLICATIONS

Lovegrove, W.S. and Brailsford, D.F., "Document Analysis of PDF files: Methods, Results, and Implications", Electronic Publishing, vol. 8(2 & 5), pp. 207–220, Jun. & Sep. 1995.

R.O. Duda and P.E. Hart, "Use of the Hough Transformation to Detect Lines and Curves in Pictures," *Communications of the ACM*, vol. 15, pp. 11–15 (Jan. 1972).

DOCUMENT MATCHING USING STRUCTURAL INFORMATION

FIELD OF THE INVENTION

The present invention relates to document matching. More particularly, the present invention relates to document matching using structural information.

BACKGROUND OF THE INVENTION

Many schemes exist to retrieve documents meeting parameters defined by a person searching for the documents. The most common method of searching is based on text. For example, a person searching documents can define a text string including one or more keywords included in the desired document, or the person searching can define a Boolean search to find documents meeting desired or specified content.

Schemes also exist to search document images. For instance, image searching schemes exist that utilize the line structure of documents. Such searching schemes are typically used with schematics, maps, flowcharts, etc. Another example of an image searching technique is shown in Niblack, W., et al., "The QBIC Project: Querying Images By Content Using Color, Texture and Shape" SPIE Proceedings, Vol. 1908, pp. 173–187 (February, 1993).

People often search physical documents because they can easily recognize documents based on their visual appearance. For example, if a person knows that a particular diagram was included in a set of presentation slides, the person can quickly search stored documents for the diagram and retrieve the related slides. However, if a person cannot remember the particular document that contains a desired diagram, then more documents may have to be examined. For documents stored on a computer system, examining and opening and thoroughly reviewing a file may be extremely time consuming especially where the number of files that must be searched is large.

What is needed is a scheme for automatically searching for an electronic document based on the visual appearance of the document.

SUMMARY OF THE INVENTION

A method and apparatus for document matching using structural information is described. A target document is analyzed to generate structural information that describes the target document. The structural information describing the target document is compared to structural information describing a set of stored documents. One or more of the stored electronic documents are retrieved based on a match between the structural information describing the target document and the structural information describing the stored electronic documents.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for document matching using structural information is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

A method and apparatus for identifying documents based on the visual structure of the document is described. A document for purposes of the present invention may be any electronic file that may convey information, including, but not limited to, papers, presentations, reports, etc. Structural information describing a document (the target document) is used to search for desired documents in a group of stored electronic documents by matching against their structural information.

Structural information may comprise any representation or description of one or more graphical features, such as, for example, a figure, drawings, shapes, lines, an arrangement of parts or line segments, or portion thereof. Graphical features may also include line segments. In images, line segments may be deleted with operators like the Hough transform R.O. Duda and P. E. Hart, "Use of the Hough Transformation to Detect Lines and Curves in Pictures," *Communications of the ACM*, Vol. 15, pp. 11–15 January, 1972). In a page description language like postscript, line segments are explicitly represented by commands like "lineto". Line segments in images and those generated by the postscript program are mapped onto cells in separate Hough transform arrays. Precision can be improved by parameterizing the Hough space by location in the image. A high degree of similarity between the Hough arrays implies they represent the same graphical image. Similarity between the Hough arrays can be measured by a simple distance function like the dot product. A more complex distance function would take the imprecise nature of the line segment location into account. Line segments detected at one location could be mapped onto several nearby locations in Hough space, thereby providing robustness to noise and improving the chance of detecting similar line segments in two images.

A similar procedure could be used with edges as features. Edges can be detected with many commonly available methods, e.g., Canny operator as disclosed by J.F. Canny, "A computational approach to edge detection," IEEE Trans. Patt. Anal. Machine Intell., vol. PAMI-8, no. 6, pp. 67–108, 1986. Line segments can then be fit to edges and the above procedure followed to match two images. However, postscript programs would be modified so that any operator that generates a straight edge would also output an edge. For example, a lineto command would generate two edges, one on each side of the line. A command that generated a filled rectangle would generate four lines, one on each side of the rectangle.

In one embodiment, the structural information is a point set, and the point sets of both the target document and a stored electronic document being searched are compared to determine whether the stored electronic document matches the target document. The image of a document (or portion thereof) is converted to a point set. When point sets match within a predetermined tolerance, the documents are considered a match. In one embodiment, the Hausdorff measure is used to compare point sets. Thus, the point sets, in effect, become queries that may be used to search for figures and other structures in databases of documents.

System Description

Figure 1:
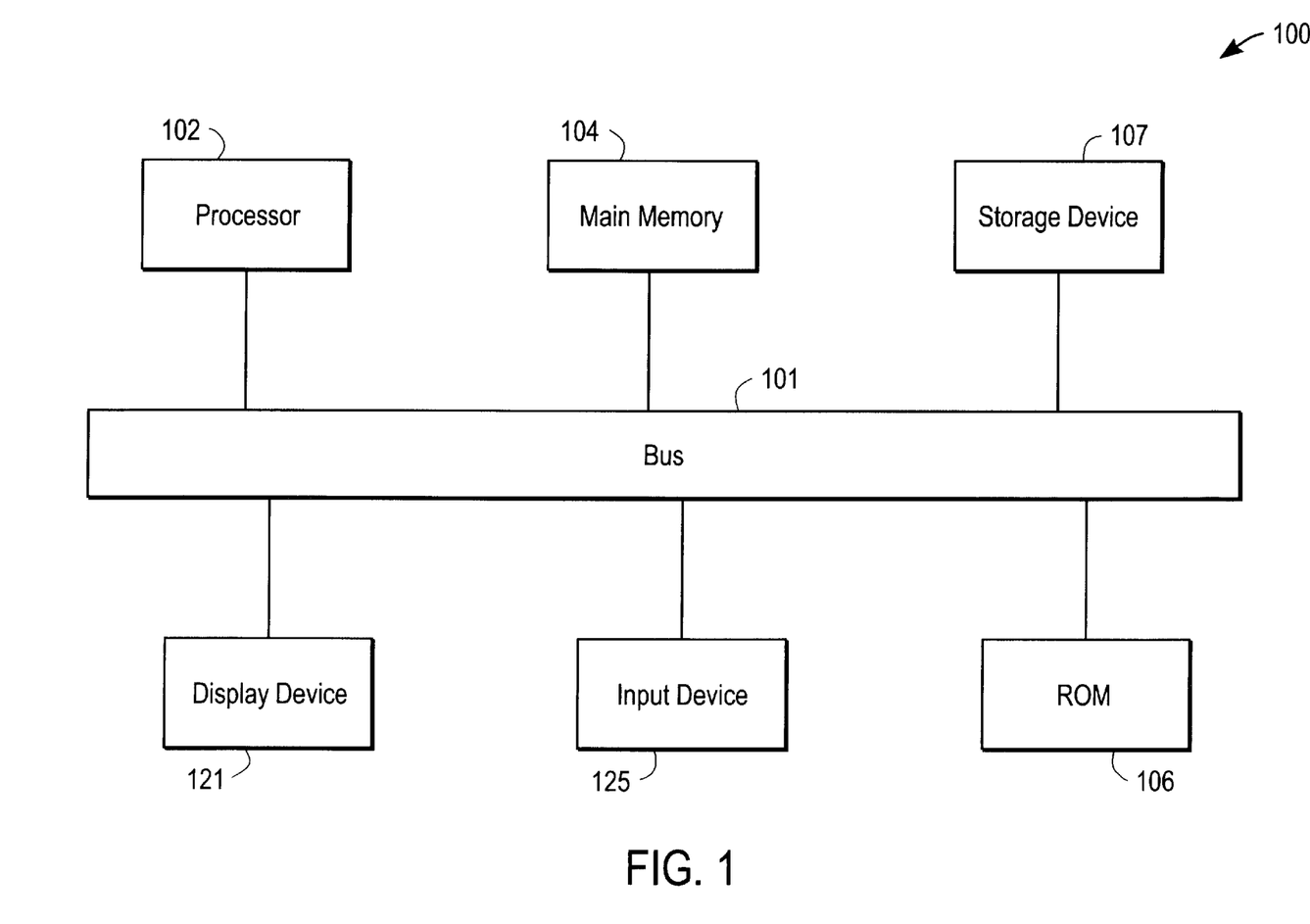
FIG. 1 is one embodiment of a document processing device.

FIG. 1 is one embodiment of a document processing device. Document processing device 100 includes bus 101 or other communication device for communicating information and processor 102 coupled to bus 101 for processing information. Document processing device 100 further includes random access memory (RAM) or other dynamic storage device 104 (referred to as main memory), coupled to bus 101, for storing information and instructions to be executed by processor 102. Main memory 104 also can be used for storing temporary variables or other intermediate information during execution of instructions by processor 102. Document processing device 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and corresponding drive can be coupled to document processing device 100. Document processing device 100 can also be coupled via bus 101 to display device 121, such as a liquid crystal display (LCD), for displaying information to a user. Input device 125 allows a user of document processing device 100 to provide input and control. Input device 125 can be, for example, a keyboard, a keypad, a mouse, a trackball, a trackpad, a touch-sensitive screen, etc.

The present invention is related to the use of document processing device 100 to match documents based on structural image data. According to one embodiment, document matching is performed by document processing device 100 in response to processor 102 executing sequences of instructions contained in memory 104. Execution of the sequences of instructions contained in memory 104 causes processor 102 to match documents using structural image data, as will be described hereafter.

Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software.

Document processing device 100 can be a computer system in which documents are generated with an application program such as a word processing program, electronic mail program, spreadsheet program etc. Document processing device 100 can also be a copier, facsimile (fax) machine, or printer that stores copies of documents processed. For example, a copier can store images of documents copied. A fax machine can store images of documents sent or received. A printer can store copies of the documents printed.

In one embodiment, document processing device 100 is an image-based filing system that digitally stores paper documents in electronic format. Conversion of paper documents into filed images, increases accessibility of information compared to manual-based systems such as cabinets, storage boxes, etc.

Figure 2:
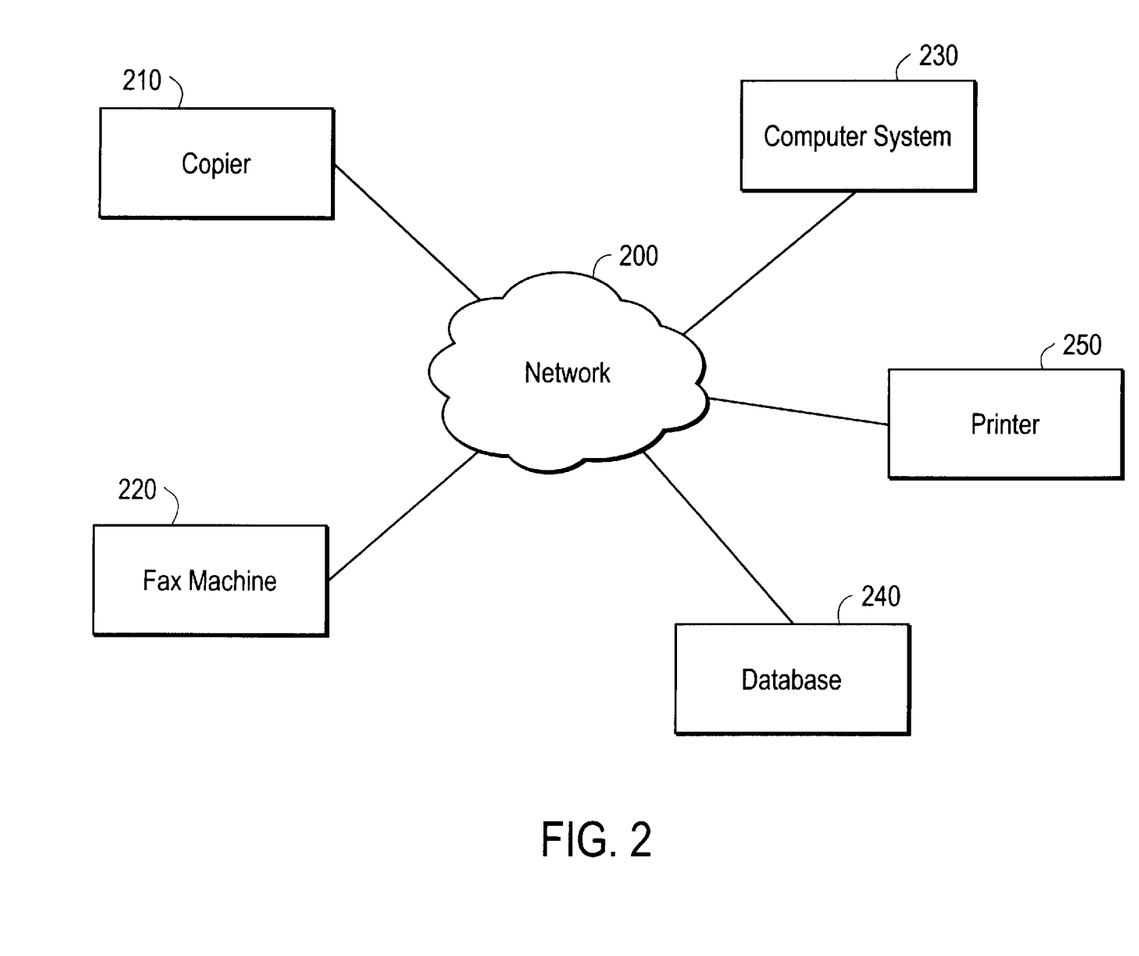
FIG. 2 is one embodiment of a document processing system having multiple document processing devices.

FIG. 2 is one embodiment of a document processing system having multiple document processing devices. The system of FIG. 2 is described in terms of multiple document processing devices interconnected by a network. However, a single such device can provide a document processing system.

In one embodiment, network 200 is a local area network that interconnects multiple document processing and other computing devices. However, other types of networks can be used. For example, network 200 can be the Internet or other wide area network.

Copier 210 is a document copying device that can store documents in database 240 or other storage device, either internal or external to copier 210. Copier 210 is coupled to network 200 to communicate images of documents copied as well as control and other information. Documents can be communicated to other devices coupled to network 200 for further processing or other purposes. In one embodiment, documents copied by copier 210 are stored in database 240 for later retrieval. By storing documents that have been processed the original paper copy of the document is no longer necessary. If the document is needed an electronic version of the document can be retrieved from database 240.

Fax machine 220 is also coupled to network 200. Fax machine 220 stores copies of documents sent and received in database 240 or other storage device, which can be internal or external to fax machine 220. Documents can, for example, be retrieved from database 240 directly and sent via fax machine 220 without the need of a physical document. Similarly, printer 250 can print documents created by devices coupled to network 200 or documents retrieved from database 240 or other storage device.

Computer system 230 can be any type of computer system and can be used to match documents according to the present invention. Computer system 230 can also be coupled to a scanner (not shown in FIG. 2) to convert documents from physical form to electronic form. Printer 250 can be coupled to network 200. Printer 250 can be, for example, a printer that stores or retrieves documents from database 240. In one embodiment, a single device provides the functionality of copier 210, fax machine 220 and printer 250.

Any of the document processing devices of FIG. 2 can be used to perform document matching functions. For example, computer system 230 can generate structural information based on a document and search database 240 to find a matching document. Other devices can be used in a similar manner to match documents.

Figure 3:
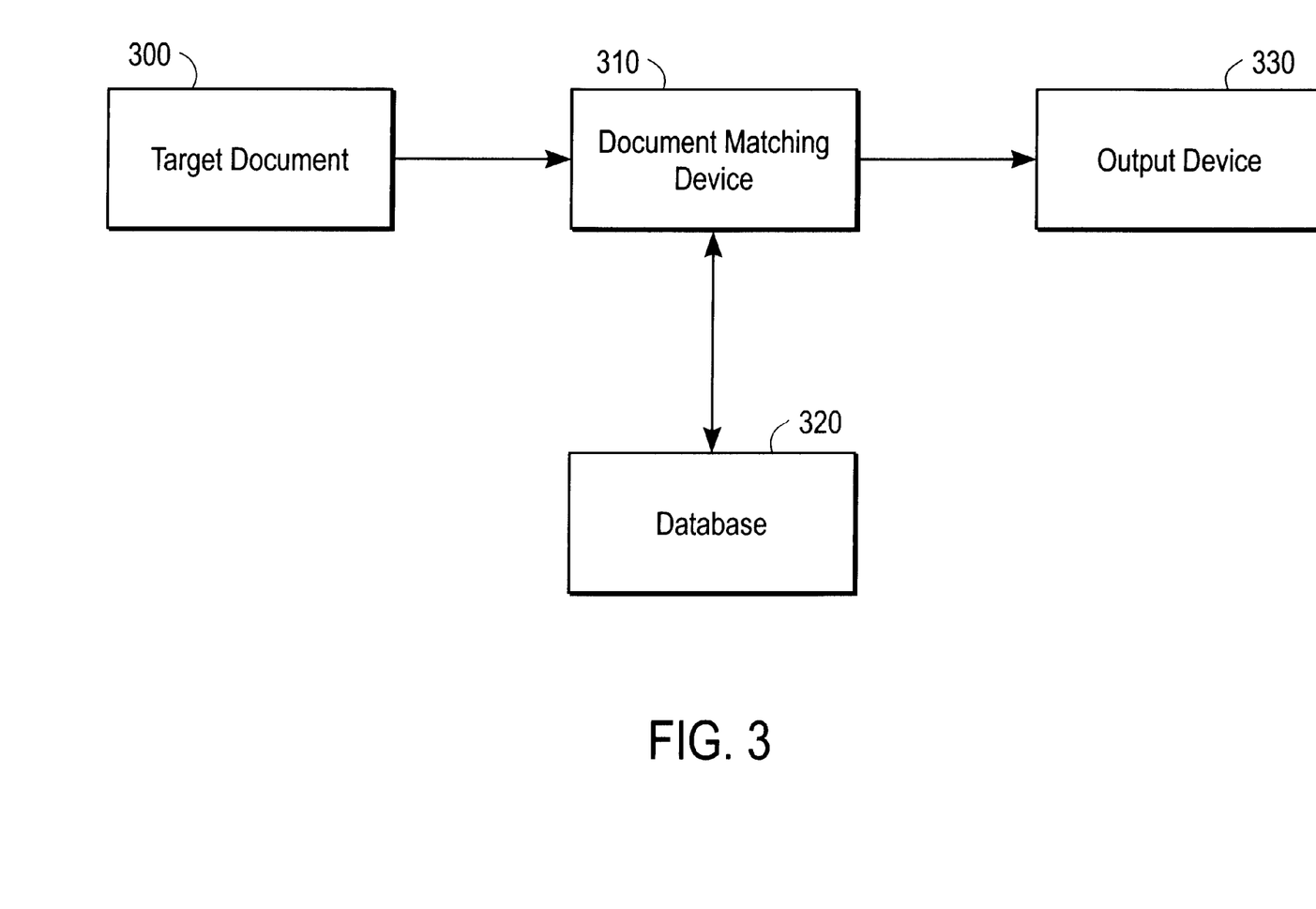
FIG. 3 is one embodiment of a block diagram of a document recognition system.

FIG. 3 is one embodiment of a block diagram of a document recognition system. The block diagram of FIG. 3 is representative of a system that matches both physical documents to electronic documents and electronic documents to other electronic documents. The document matching allows graphical features, or components, of a document to be used to retrieve one or more stored electronic documents having the same or a similar graphical components, or features. Such features may include, but are not limited to, figures, lines, shapes, textures, dimensions, and other features such as have been described above.

Target document 300 can be either a physical document or an electronic document. Target document 300 has some graphical feature in common with an electronic document to be retrieved. For example, target document 300 can include a block diagram of a particular system. The block diagram of target document 300 can be used to retrieve other documents such as, for example, a technical report, presentation slides, and a patent application, having the same or a similar block diagram.

If target document 300 is a physical document, document matching device 310 includes a device that can convert the physical document into an electronic document, such as for example, a scanner or fax machine. Document matching device 310 can be, for example, a computer system, a scanner, a copier, etc. Target document 300 comprises either the electronic document produced by document matching device 310 or a separate electronic document. Target document 300 is manipulated for purposes of document matching, and such manipulation is described in greater detail below.

Document matching device 310 analyzes the structure of target document 300 in order to determine structural information describing or contained in target document 300. In one embodiment, the structural information is a point set characterization of target document 300. The structural information is used to search database 320 for a document that matches the structural information. In one embodiment, matches are determined using the Hausdorff Method, which is described in greater detail below. For more information on the Hausdorff method, see Huttenlocher, Klanderman & Rucklidge, "Comparing Images Using the Hausdorff Distance," IEEE Transactions on Pattern Analysis and Machine Intelligence, V. 15, September 1993, pgs. 850–863.

The matching document(s) are output by output device 330. Output device 330 can be, for example, an electronic display device such as a liquid crystal display or cathode ray tube, etc. Output device 330 can also be a device that generates physical documents such as, for example, a printer or fax machine. In another embodiment, output device 330 comprises a device that sends elective documents over a channel.

Figure 4:
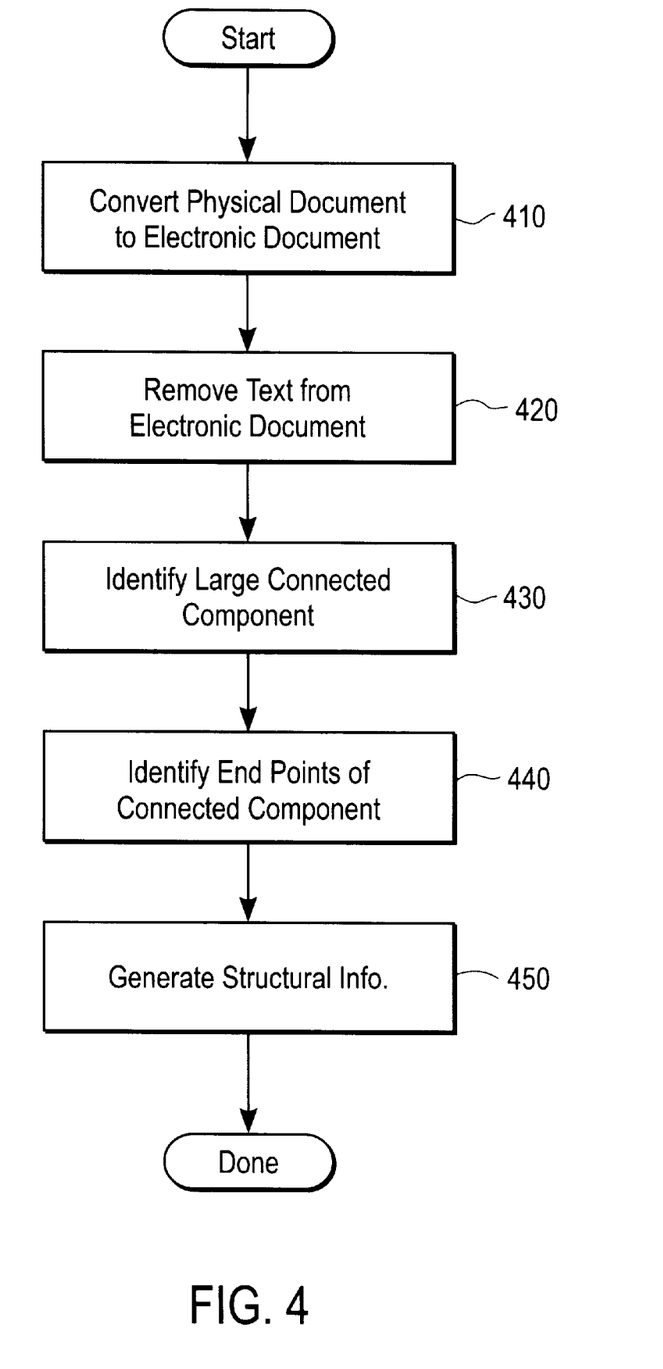
FIG. 4 is one embodiment of a flow diagram of a process for generating structural information describing a physical document.

FIG. 4 is one embodiment of a flow diagram for generating structural information describing a physical document. The flow of FIG. 4 is performed by processing logic and generates structural information that can be used to match a target physical document to a stored electronic document. In one embodiment, the processing logic may comprise software executing on a dedicated or general purpose computer system or machine, dedicated hardware, or a combination of both.

Referring to FIG. 4, processing logic converts a physical document into a target electronic document (processing block 410). Conversion can be accomplished, for example, by scanning the physical document with a scanner in manner well-known in the art. Conversion can also be accomplished by making a copy with a copier or by sending or receiving a fax with a fax machine, in which an electronic version of what was copied or faxed is automatically retained. In one embodiment, the device used to convert the physical document to an electronic document stores a copy of the electronic document in a database, either within the device or in another device accessed via a bus or network connection (not shown in FIG. 4).

Next, processing logic removes text from the target electronic document (processing block 420). The text is removed so that only structural information remains, thereby permitting a search based on the graphical features of the document and not influenced by the textual content of the document. In one embodiment, the target electronic document is downsampled after the text is removed (not shown in FIG. 4). In one embodiment, the downsampling may occur at 144 dpi.

Then, processing logic identifies connected components or other graphical features (processing block 430). Note that, in one embodiment, only a collection of components, connected or unconnected, is used to identify the document(s) being searched. Multiple components may be searched at the same time. These features of the figure are used for searching and retrieving similar figures.

The connected component is used as a characteristic component for the target electronic document. Document matching can be performed without narrowing the relevant structure to a single large connected component. Using a single component reduces the processing required for matching and thereby improves matching speed of the system. In one embodiment, the target electronic document is downsampled after the connected component is identified (not shown in FIG. 4). In one embodiment, the downsampling rate may be at 72 dpi.

Using the processing logic identifies the end points of line segments (processing block 440). One method for identifying end points is to use a smallest univalue segment assimilating nucleus (SUSAN) algorithm. Non-linear filtering is used to define which parts of the image are closely related to each individual pixel, each pixel associated with a local image region which is of similar brightness to that pixel. New feature detectors are based on the minimization of this local image region. A noise reduction algorithm uses the region as a smoothing neighborhood. Other methods for identifying the end points can also be used, such as for instance, one method of convolving an image with a mask design and detecting line end points. The convolution output is thresholded and based on whether the threshold has been met, a match is identified. Many other feature detection techniques may be used.

Processing logic generates structural information based on the end points of the graphical feature (processing block 450). In one embodiment, the structural information is a set of points corresponding to the ends of line segments; however, other structural information may be used such as, for example, but not limited to, line segments, curves, etc.

The structural information in the target electronic document can then be used to match the target electronic document to stored electronic documents. In one embodiment, structural information describing stored electronic documents is compared to the structural information describing the target electronic document. The structural information associated with the stored electric documents may be stored prior to the document matching process or may be generated in real time. If the structural information matches within a predetermined tolerance, the corresponding stored electronic document is considered a match. The matching document(s) can then be retrieved for use by the user.

In one embodiment, matching is performed using the Hausdorff Method. Given two sets of points:

$$A=\{a_1,\ldots,a_m\}$$

and $$B=\{b_1,\ldots,b_n\}$$

the Hausdorff distance is $$H(A,B)=\max(h(A,B)h(B,A)) \qquad \text{(Equation 1)}$$

where $$h(A, B) = \max_{a \in A} \min_{b \in B} \|a - b\|. \qquad \text{(Equation 2)}$$

The function h(A, B) is the Directed Hausdorff distance from A to B and identifies the point $a \in A$ that is farthest from any point of B, and measures the distance from a to its nearest neighbor in B. The Hausdorff distance, H(A,B), measures the degree of mismatch between two sets, as it reflects the distance of the point of A that is the farthest from any point of B and vise versa.

In other words, if the Hausdorff distance is d, then every point of A is within a distance d of some point of B and vice versa. In one embodiment, the Hausdorff distance d is used at a tolerance value for determining matches. Alternatively, other matching methods can be used.

Figure 5:
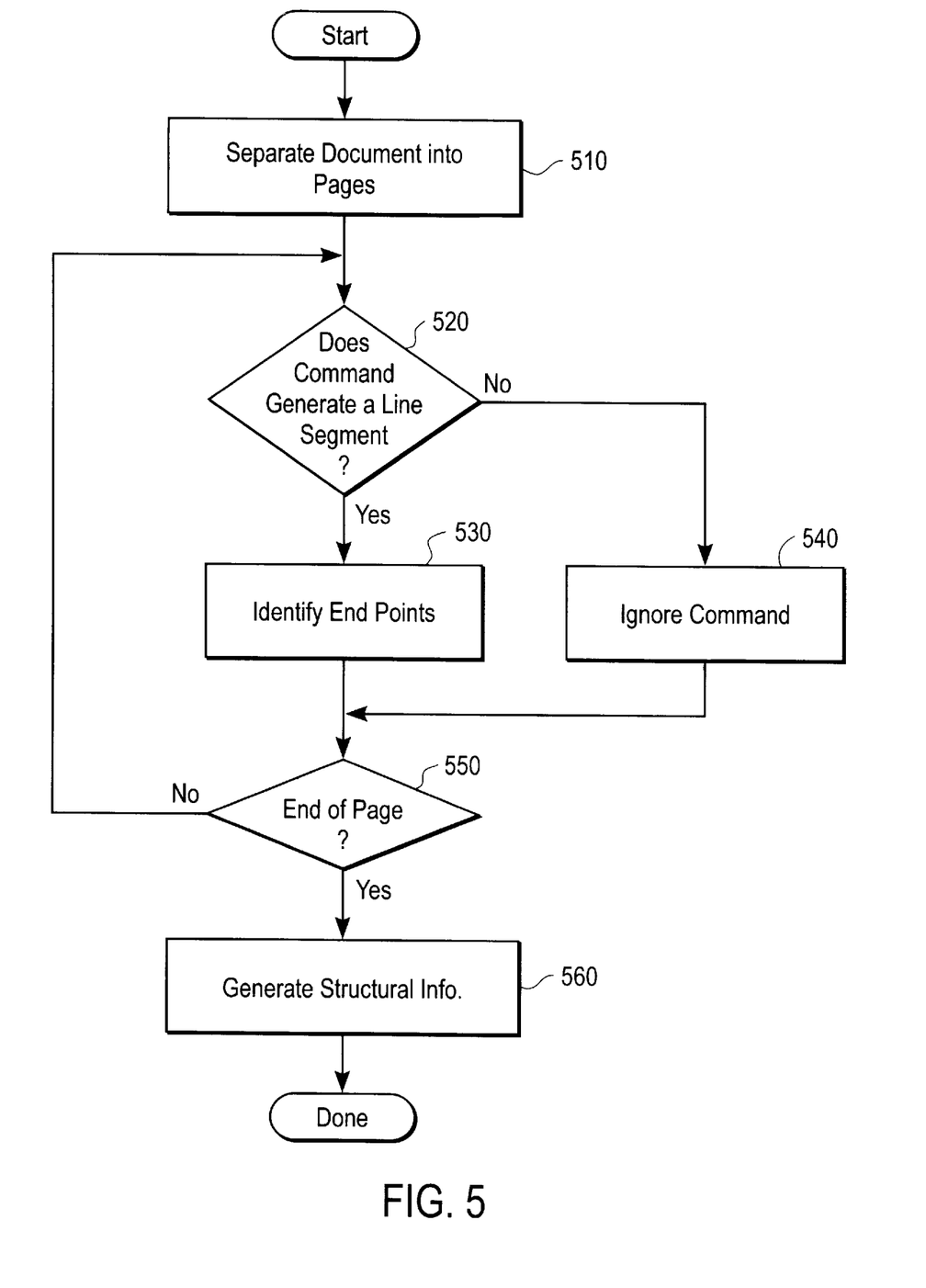
FIG. 5 is one embodiment of a flow diagram of a process for generating structural information describing an electronic document.

FIG. 5 is one embodiment of a flow diagram of a process for generating structural information describing a target electronic document. Processing logic, such as described above, performs the process for generating structural information. The exemplary process shown in FIG. 5 describes generating structural information for a single page of an electronic document. In one embodiment, each page of a document is analyzed in a similar manner. Also, the process may be applied to electronic documents that are stored and are to be compared with a target document.

Processing logic initially separates the target electronic document into pages (processing block 510). In one embodiment, structural information is generated for each page. Alternatively, multiple pages can be used to generate structural information describing the target electronic document. In one embodiment, graphics that cover multiple pages may be handled. In one embodiment, a postscript file contains explicit page eject commands. These allow the handling of multi-page graphics one at a time. However, in some other postscript implementations or some other page description languages, one could detect graphics that span page breaks and do feature matching on such graphics as a unit.

Processing logic then determines whether a particular command generates a line segment (processing block 520). In one embodiment, each command in a page description language (e.g., PostScript) is analyzed to determine whether a line segment is generated. Using PostScript as an example, commands such as lineto, lineto, moveto, etc. are identified as commands that generate line segments.

If a command generates a line segment, processing logic identifies the end points of the line segment (processing block 530). Otherwise, the command is ignored (processing block 540). Processing logic uses the end points of the line segments to generate structural information describing the target electronic document and repeats the parsing process until the end of a page is reached (processing block 550). A similar process is performed for each page of the target electronic document (not shown in FIG. 5).

Note that the parsing process may not be entirely a static process. PostScript is a programming language. In one embodiment, the PostScript interpreter is run with specially modified logic so that every time the lineto command is executed, the endpoints are output. The reason is that the PostScript instructions may contain a command like draw a line from (x,y) to (x+day of month, y), i.e., day of month can only be determined at run time. This generates a "perfect" set of features not subject to the digitalization noise present when detecting such features from an image.

Processing logic generates structural information based on the end points identified (processing block 560). In one embodiment, the structural information is a point set including the end points of the lines included on a page. Of course, other types of structural information can be generated based on the end points of lines on a page.

The structural information generated based on an electronic document is used in a similar manner as structural information generated based on a physical documents. The structural information generated is compared to structural information describing one or more stored electronic documents. When an acceptable match is found, the corresponding stored documents can be retrieved and presented to a user.

FIGS. 6A, 6B and 6C illustrate an example document, an extracted figure, and a point set generated therefrom for the structural information of a graphic feature, respectively.

In the foregoing specification, the present invention has been described with reference to specific embodiments thereof. It will, however, be evident that various modifications and changes can be made thereto without departing from the broader spirit and scope of the present invention. The specification and drawings are, accordingly, to be regarded in an illustrative rather than a restrictive sense.

What is claimed is:

1. A method comprising:
   generating structural information, including a point set, describing a target document;
   comparing the structural information describing the target document to a set of structural information describing a set of stored electronic documents; and
   retrieving one or more stored electronic documents from the set of stored electronic documents if the structural information describing the stored electronic documents matches the structural information describing the target document within a predetermined tolerance;
   analyzing the target document to determine the structural information describing the target document, wherein the analyzing comprises:
   receiving a raster image; and
   removing text from the raster image.

2. The method of claim 1, wherein the analyzing further comprises:
   determining end points for a line segment corresponding to remaining components of the raster image; and
   generating the point set based on the end points.

3. The method of claim 1, wherein comparing the structural information describing the target document to a set of structural information describing a set of stored electronic documents comprises comparing point sets using the Hausdorff Method.

4. The method of claim 1 further comprising generating a physical document based on the one or more electronic documents retrieved.

5. The method of claim 1, wherein the analyzing further comprises:
   identifying corners corresponding to remaining components of the raster image; and
   generating the point set based on the corners.

6. A machine-readable medium having stored thereon sequences of instructions, which when executed by a processor cause the processor to perform the following comprising:
   generating structural information, including a point set, describing a target document;
   comparing the structural information describing the target document to a set of structural information describing a set of stored electronic documents; and
   retrieving one or more stored electronic documents from the set of stored electronic documents if the structural information describing the stored electronic documents matches the structural information describing the target document within a predetermined tolerance; and
   analyzing the target document to determine structural information describing the target document, comprising:
   receiving a raster image; and
   removing text from the raster image.

7. The machine-readable medium of claim 6, wherein the sequence of instructions cause the processor to further perform the following comprising:
   determine end points for a line segment corresponding to remaining components of the raster image; and
   generate the point set based on the end points.

8. The machine-readable medium of claim 6, wherein the sequences of instructions that cause the processor to compare the structural information describing the target document to a set of structural information describing a set of stored electronic documents by comparing point sets using the Hausdorff Method.

9. The machine-readable medium of claim 6 further comprising sequences of instructions that cause the processor to generate a physical document based on the one or more electronic documents retrieved.

10. The machine-readable medium of claim 6, wherein the sequence of instructions cause the processor to further perform the following comprising:
    identifying corners corresponding to remaining components of the raster image; and
    generating the point set based on the corners.

11. An apparatus, comprising:
    means for generating structural information, including a point set, describing a target document;
    means for comparing the structural information describing the target document to a set of structural information describing a set of stored electronic documents;
    means for retrieving one or more stored electronic documents from the set of stored electronic documents if the structural information describing the stored electronic documents matches the structural information describing the target document within a predetermined tolerance;
    means for analyzing the target document to determine structural information describing the target document;
    means for receiving a raster image; and
    means for removing text from the raster image.

12. The apparatus of claim 11, wherein the means for analyzing the target document to determine structural information describing the target document comprises:
    means for determining end points for a line segment corresponding to remaining components of the raster image; and
    means for generating the point set based on the end points.

13. The apparatus of claim 11, wherein the means for comparing the structural information describing the target document to a set of structural information describing a set of stored electronic documents comprises means for comparing point sets using the Hausdorff Method.

14. The apparatus of claim 11 further comprising means for generating a physical document based on the one or more electronic documents retrieved.

15. A document matching apparatus comprising:
    a processor to generate structural information, including a point set, based on a target document;
    a storage device coupled to the processor to store multiple electronic documents and structural information based on each of a set of one or more electronic documents;
    wherein the processor is configured to compare the structural information based on the target document to the structural information based on the electronic documents to determine whether the structural information based on the target document and structural information of one or more electronic documents matches within a predetermined tolerance, and wherein the processor is configured to analyze the target document to determine structural information describing the target document, including receiving a raster image and removing text from the raster image.

16. The document matching apparatus of claim 15 further comprising a document converting device to convert physical documents to electronic documents.

17. The apparatus of claim 11, further comprising:
    means for identifying corners corresponding to remaining components of the raster image; and
    means for generating the point set based on the corners.

* * * * *

UNITED STATES PATENT AND TRADEMARK OFFICE
CERTIFICATE OF CORRECTION

PATENT NO.     : 6,446,099 B1                                    Page 1 of 1
DATED          : September 3, 2002
INVENTOR(S)    : Peairs It is certified that error appears in the above-identified patent and that said Letters Patent is hereby corrected as shown below:

<u>Column 8,</u>
Lines 62-64, delete "Figures 6a, 6B and 6C illustrate an example document, an extracted figure, and a point set generated therefrom for the structural information of a graphic feature, respectively."

Signed and Sealed this

Fourth Day of February, 2003

JAMES E. ROGAN
*Director of the United States Patent and Trademark Office*